United States Patent [19]

Raquet

[11] 4,355,578
[45] Oct. 26, 1982

[54] RAILWAY WHEELS AND RAILS DAMPING STRUCTURES

[75] Inventor: Erwin Raquet, Witten, Fed. Rep. of Germany

[73] Assignee: Fried. Krupp Hüttenwerke AG, Bochum, Fed. Rep. of Germany

[21] Appl. No.: 60,181

[22] Filed: Jul. 24, 1979

Related U.S. Application Data

[63] Continuation-in-part of Ser. No. 30,861, Apr. 17, 1979, abandoned.

[30] Foreign Application Priority Data

Apr. 17, 1978 [DE] Fed. Rep. of Germany ....... 2816561

[51] Int. Cl.³ .................. B60B 17/00; B60C 7/06; E01B 19/00; F16F 15/12
[52] U.S. Cl. .................................. 104/1 A; 74/574; 105/452; 181/209; 181/211; 238/382; 295/7; 295/11; 295/31 R; 301/6 WB
[58] Field of Search ............... 238/382; 295/7, 31 R, 295/11; 64/1 V; 74/574; 105/452; 181/209, 211, 258, 266, 276; 188/1 B, 218 A; 192/30 V; 301/6 WB; 104/1 A

[56] References Cited

U.S. PATENT DOCUMENTS

| 208,880 | 10/1878 | Atwood | 238/382 X |
|---|---|---|---|
| 1,718,100 | 6/1929 | Ackerman | 74/574 X |
| 1,765,477 | 6/1930 | Ackerman | 295/7 |
| 1,782,285 | 11/1930 | Bourdon | 295/7 X |
| 1,819,266 | 8/1931 | Rued | 295/7 X |
| 1,958,642 | 5/1934 | Rosenberg | 295/7 X |
| 2,636,399 | 4/1953 | O'Connor | 188/1 B X |
| 2,880,599 | 4/1959 | Hlinsky | 181/209 X |
| 3,327,812 | 6/1967 | Lazan | 188/1 B |
| 3,377,097 | 4/1968 | Swanson | 295/7 |
| 3,388,772 | 6/1968 | Marsh et al. | 188/1 B |
| 3,791,481 | 2/1974 | Yazaki | 181/209 |
| 4,183,572 | 1/1980 | Albrecht et al. | 301/6 WB |
| 4,203,546 | 5/1980 | Raquet et al. | 238/382 X |

FOREIGN PATENT DOCUMENTS

| 966656 | 8/1957 | Fed. Rep. of Germany | 238/382 |
|---|---|---|---|
| 2616393 | 11/1977 | Fed. Rep. of Germany | 238/382 |
| 321783 | 7/1957 | Switzerland | 238/382 |

OTHER PUBLICATIONS

Ein Beitragzum Problem Entstenhung der Schienenriffeln; Haass, Hans; Eisenbahningenieur 27, (1976) 5, pp. 200-207.
Schienenriffeln als Resonanzeffekl bei Geschwindigkeitsabhängiger Frequenzaufspaltung von Radkr anz-Biegeeigenschwingungen und Michtlinearen Kontaktkräften zwischen Rad und Schiene; Werner, Karl; ETR (Eisenbahntechnische Rundschau); 25 Jun. 1976, pp. 381-391.

Primary Examiner—Bruce H. Stoner, Jr.
Assistant Examiner—Howard Beltran
Attorney, Agent, or Firm—McAulay, Fields, Fisher, Goldstein & Nissen

[57] ABSTRACT

A system comprising a rail wheel and rail has the wheel and preferably also the rail provided with vibration dampers which absorb vibration having the frequency of the radial resonant vibration frequency of the wheel, for the purpose of preventing the formation of ripples in the rail head's surface on which the wheel runs.

11 Claims, 5 Drawing Figures

PRIOR ART

RAILWAY WHEELS AND RAILS DAMPING STRUCTURES

This application is a continuation-in-part of application Ser. No. 030,861 filed Apr. 17, 1979 now abandoned.

BACKGROUND OF THE INVENTION

In a system comprising a wheel and a rail on which the wheel runs, exemplified by a railroad wheel and rail, it is known that with time vertical ripples are formed in the running surface of the rail head. This produces an audible vibration when the wheel rolls on the rails, which characteristically increases with increasing wheel traveling speed. Railroad rails are supported via rail seats by interspaced rail ties, and these parts are subjected to objectionable and possibly damaging stress by such vibration. Railroad rolling stock and particulary the trucks are subject to the vibration with corresponding objectionable stress which might be damaging.

The rails are made of steel which is inherently elastic and it has been generally assumed that the ripple formation is connected with the fact that the rail spans between the ties operate as highly stressed beams subjected to intermittent beam flexure under the traveling wheel weight, so that the rails acquire an oscillatory condition dependent on their resonant frequency.

Railroad wheels are also made of steel and are pressed on a steel axle to form a wheel set and a plurality of wheel sets support a truck via sprung journals, the truck receiving a portion of the freight of passenger car above and of the power plant in the case of a locomotive.

There are a number of used and unused proposals for reducing or preventing ripples. Thus, it was proposed ("Eisenbahningenieur" 27 (1976), pages 200-207) to use a special alloy for the rail material and/or to arrange the rail on a less elastic support structure. It was further proposed to undertake particular measures on the wheel or on the wheel set, e.g., reduction of the unsprung wheel set mass. It was also proposed (German Pat. No. 966,656, Swiss Pat. No. 321 783) to provide transverse alterations, e.g., in the form of thickening providing additional masses, which are distributed over the length of the rail at unequal distances for damping the characteristic oscillations of the rail. Finally, it was proposed ("ETR" journal (25) 6-1976, pages 381-391, German Offenlegungsschrift No. 2 616 393), to provide resonance absorbers attached to the wheel rim, the characteristic frequency of which are tuned to the axial natural frequency in bending of the wheel rim.

None of these proposals have provided a satisfactory result. It is still necessary to grind off the ripples on the surface of the rail occasionally.

The object of the invention is to improve the rail-wheel system so that the ripple formation is more substantially reduced.

SUMMARY OF THE INVENTION

The present invention is based on a new concept, namely, that a steel wheel, such as a railroad wheel, via the mass and elasticity of its steel, has a radial vibration resonant frequency resulting in appreciable radial amplitude when the wheel rotates at critical speed, and that it is this type of vibration that has caused the trouble described above. The wheel running on the rail at conventional speeds can acquire its critical speed, and it then resonants and induces forced vibrations in the rail of the same frequency as the wheel's resonant frequency. At normal wheel rolling speeds, the wheel-rail system becomes a resonating system, the wheel then causing the formation of the ripples on the rail head running surface. The vertical resonant frequency of the rail is not of predominant significance. Instead, it is the radial wheel vibration which at the wheel's radial vibration resonant frequency causes the wheel rim to change rapidly from circular to slightly elliptical form, and this is mainly responsible for the ripple formation on the rail head.

Consequently, according to this invention, a circumferential series of interspaced resonant vibration dampers or absorbers, radially spaced from the wheel hub and radially operating, are used for each wheel, with the absorbers tuned to the radial resonant frequency of the wheel. Preferably, in addition, the rail supported by its interspaced supports, such as railroad ties, is provided with a longitudinal series of interspaced resonant vibration absorbers operating vertically and tuned to the resonant frequency of the radial vibration of the wheel. These rail absorbers are not tuned to the rail's vertical resonant frequency deliberately, although by chance it may be the same as the wheel's radial resonant frequency.

In both cases, the absorbers are rigidly fixed to the steel wheel and rail and oriented to absorb the radial vibrations in the case of the wheel and the vertical vibrations forced on the rail by the wheel vibration.

In either case, the vibration absorber can comprise a steel base from which steel reeds extend transversely to the direction of vibration and with damping material sandwiched between the reeds. With the reeds having the frequency to be expected in the case of the resonant or critical radial vibration frequency of the wheel, the vibration of the reeds is damped with consequent damping of the vibration to be absorbed.

BRIEF DESCRIPTION OF THE DRAWINGS

A specific example of the invention is illustrated by the accompanying drawings, as follows.

DETAILED DESCRIPTION OF THE DRAWINGS

Figure 2:
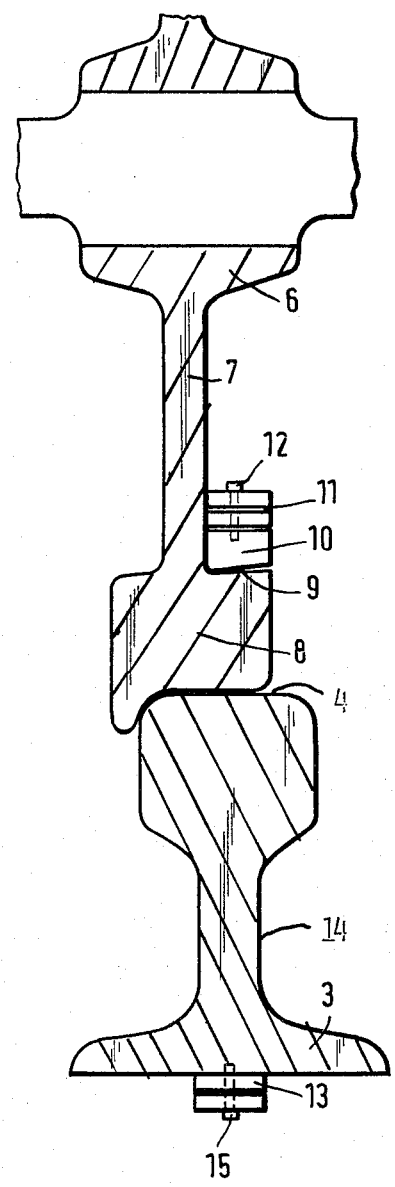
FIG. 2 is a vertical cross section of the wheel and rail.

The above drawings show as one example of the invention, a steel railroad rail 1 supported by interspaced ties or supports 2 on which the rail's base 3 rests. The rail has a head forming the surface 4 for supporting a steel railroad wheel 5 having an axle hub 6 for pressing on a steel axle (FIG. 2), a web 7 and a rim 8 having a peripheral surface rolling on the rail surface 4. Unless prevented, ripples can form on this surface 4 so that the surface must be refinished by grinding which is an expensive practice. The illustrated wheel and rail profiles are typical of continental European practice, but USA profiles are comparable.

The radially inside surface 9 of the wheel rim 8 radially presses against a ring 10 and holds it rigidly in position beside the wheel's web 7. This ring 10 is integrated, so far as vibration is concerned, with the steel wheel 5, and can be installed by heating the wheel to thermally expand it radially, placing the ring 10 in position, and by cooling, shrinking the wheel radially inwardly tightly on the ring.

Even assuming the rail surface 4 is perfectly smooth, it will present some unavoidable surface irregularities extending longitudinally, the rail being a rolled steel product. Also, the rail is supported only at longitudinally interspaced points via the rail ties 2. In the European continent, the tie spacing is typically around 0.6 m, and the wheel diameter may range from about 700 to 1200 mm. Under such conditions, at normal wheel rolling speeds, the wheel will have in its radial direction a resonant vibration frequency somewheres between 0.9 and 1.5 khz, and this vibration results in forced vibrations vertically in the rail and having the same frequency. The wheel vibrates in an elliptical manner when within its critical rotation speed and forces the rail to vibrate. It is this action that causes the ripples to form in the rail surface 4.

The prior art believed that the rail had an inherent resonant frequency which was attained by the rolling action of the wheel, possibly causing forced vibration of the wheel itself at the rail resonant frequency. Therefore, if resonant vibration absorbers were to be used, it was believed that they should be tuned to the vertical resonant frequency of the rail.

When the wheel radially vibrates at its resonant frequency, its rim forms four nodal points, the wheel and its rim being elliptically distorted. The present invention is concerned with vibration in the radial direction. The forced vibrations in the rail, transmitted by the radial vibrations of the wheel, are in a vertical direction and have the frequency of the radial resonant frequency of the wheel.

The previously described ring 10 is used to mount a circumferential series of interspaced vibration absorbers of the resonant type using vibration damping. For this, each absorber has a base 11 through which a screw 12 is passed and screwed radially into the inside surface of the rim 10. For the rail 1, each absorber has a base 13 screwed into the bottom of the base 3 of the rail from which the rail web 14 extends upwardly to the railhead providing the surface 4 receiving the vibration of the wheel, this being done by screws 15 screwed into holes formed in the bottom of the rail symmetrically with respect to the rail web 14. Both as to the wheel and rail each damper has reeds extending from the base transversely with respect to the direction of the vibration to be absorbed or damped. These reeds may have resonance frequencies that differ, the reeds 16 being shown thicker than the reeds 17 and 18. The advantage of this is that some of the absorbers can be tuned to the fundamental resonant radial frequency of the wheel 5 while others may be tuned to damp the high frequency screeching sounds produced when a wheel set rolls around a curved trackway producing the characteristic frequency of frictional rubbing of the wheel rims on the rails. With the resonant frequencies of the reeds tuned to the resonant radial frequency of the wheel, the reeds vibrate or resonate, the energy being absorbed by damping material sandwiched between the reeds, as described later, and thus being dissipated with the result that the radial wheel vibration is absorbed or damped.

Figure 3:
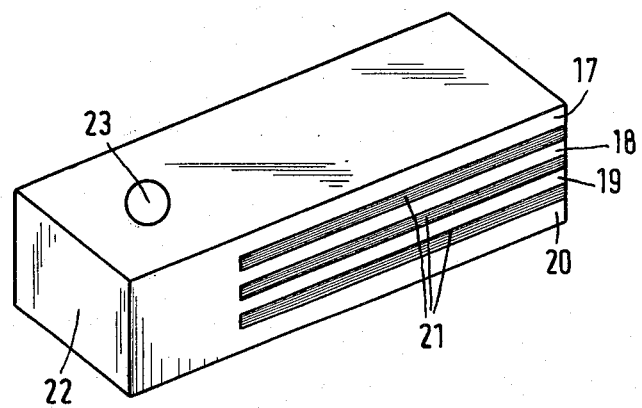
FIG. 3 is an isometric view of one of the vibration absorbers or dampers.

In FIG. 3 one of the resonant vibration absorbers is illustrated in detail. In this case the reeds 17 and 18 have additional reeds 19 and 20 with vibration absorbing material 21 sandwiched or embedded between the reeds, the reeds extending from a base 22 through which a screw hole 23 is formed for passage of the screws 12 or 15 as the case may be. The reeds and base are shown as being integrally made from metal, possibly steel, while the material 21 can be any of the kinds used for mechanical vibration damping or absorbing purposes such as a silicone rubber.

In FIG. 3 the vibration damper with its reeds tuned to the characteristic resonant radial vibration frequency of the wheel 5, are formed integrally with the base 22, by being machined from a solid piece of metal. It would also be possible to use a multiplicity of flat metal plates interspaced by spacers stacked to form the base. The reeds could also be formed in the manner of tuning forks with their interjoined ends appropriately interspaced and stacked as required. In all cases, the reeds should be damped by good contact with suitable damping material capable of absorbing and dissipating the vibration energy of the reeds.

To function, the reeds should be transversely positioned with respect to the vibration direction, extending circumferentially in the case of the wheel 5 and horizontally in the case of the rail 1.

Figure 1:
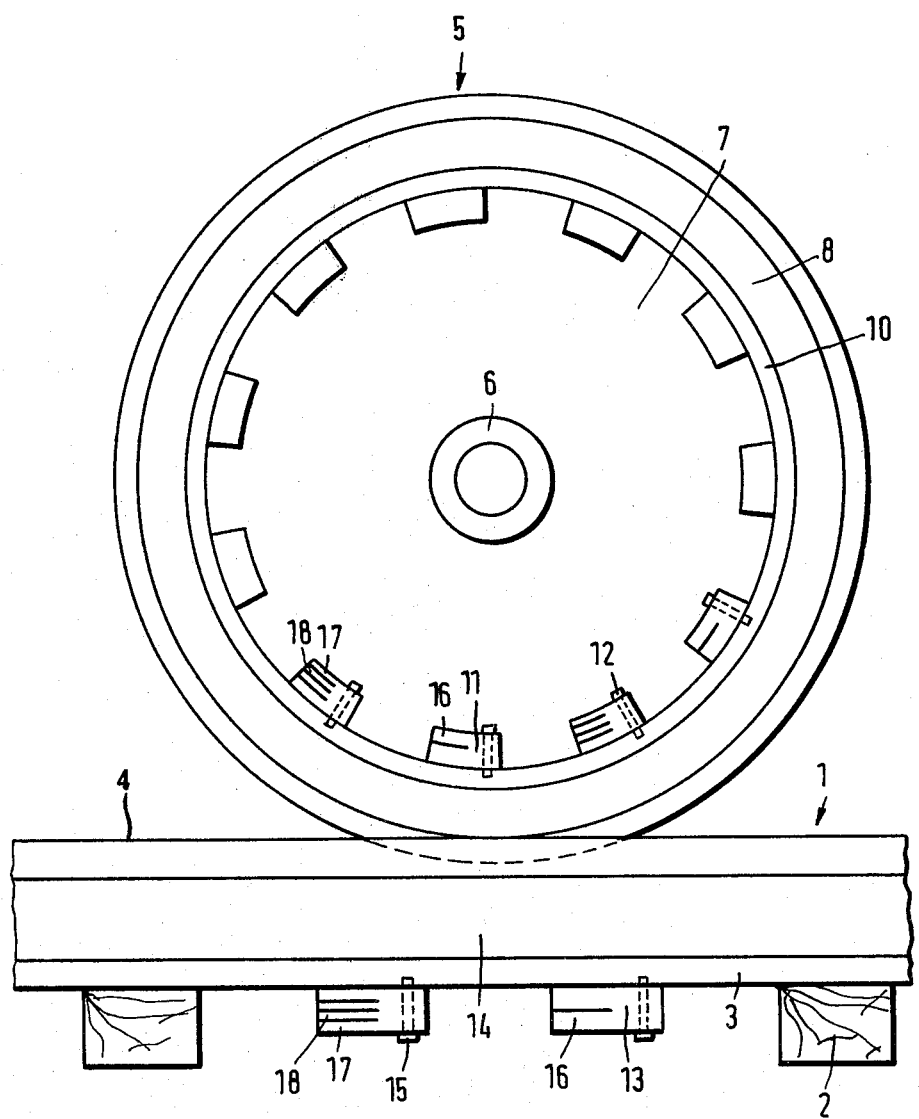
FIG. 1 is a side view of a railroad wheel on a railroad rail supported by interspaced ties, rail seats not being illustrated.
Figure 4:
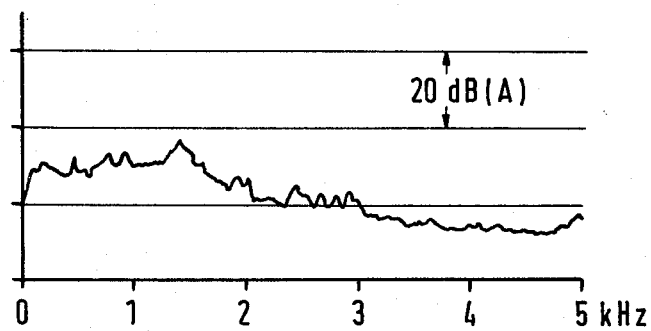
FIG. 4 shows a spectrum of the radial oscillations of a wheel having the vibration absorbers of the present invention.
Figure 5:
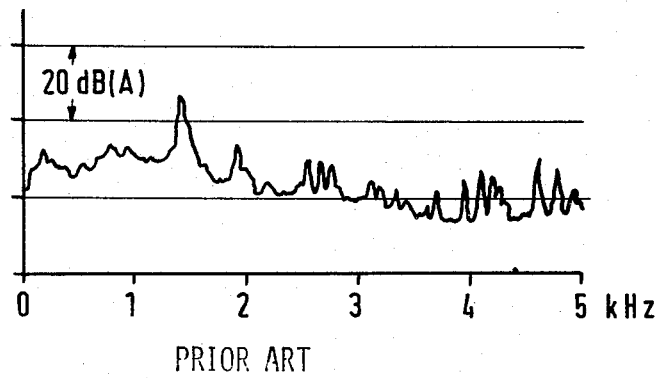
FIG. 5 shows the spectrum of the same wheel not damped by such absorbers and representing the conventional prior art condition.

FIGS. 4 and 5 are provided to show the results obtainable by the practice of this invention. FIG. 5, showing the prior art as represented by the normal railroad wheel on a normal rail and running at normal speeds, graphically shows that in the area of 1.5 khz a definite wheel oscillation occurs, while FIG. 4 shows that using the principles of the present invention, such as illustrated by FIG. 1 in particular, the same peak is very substantially subdued. The two spectrums show that in general the wheel using resonant dampers tuned to the radial resonant wheel frequency, provides a generally smoother spectrum than in the case of the wheel undamped as to its resonant radial frequency.

What is claimed is:

1. In a system for absorbing a rail wheel's radial vibrations, said rail wheel having a rim, an axle hub and a web interconnecting said axle hub with said rim, said system including a plurality of independent vibration absorbers, the improvement comprising:
   a circumferential series of said vibration absorbers forming wheel vibration absorbers circumferentially interspaced along said rim;
   said wheel vibration absorbers being tuned to a radial resonant frequency of said rail wheel induced by said rail wheel's radial vibrations; and
   said wheel vibration absorbers being oriented to damp radial vibration.

2. In the system of claim 1, wherein said vibration absorbers include a steel base having at least two vibrating reeds and damping material sandwiched therebetween, the improvement further comprising:
   means connecting said steel base in the system with said reeds extending in a direction transversely to the direction of vibration.

3. In the system of claim 1, wherein said rim has an inside surface which radially presses against a ring for holding thereof rigidly in position beside said web, said wheel vibration absorber having a base portion, and including means connecting said base portion of said wheel vibration absorbers to said ring for connection with said rail wheel.

4. The system of claim 1 wherein each of said vibration absorbers comprise resonance absorbers including a reed embedded in a damping material, said reed having one end fixedly connected to a structure being damped.

5. The system of claim 4, including additional reeds each having one end fixedly connected with each other and the structure being damped and with said first-mentioned reed, each of said reeds having a thickness related to characteristic frequencies of the vibration frequency to be damped, and additional damping material between each pair of adjacent reeds.

6. The system of claim 1, wherein said vibration absorbers include at least one pair of reeds having one end fixed to each other and said wheel, and damping material between each pair of reeds, and spacer plates arranged at one end of said reeds at an equal distance from each other, said reeds comprising plates of substantially identical length and width, and said reeds having different thicknesses for tuning of said vibration absorbers to different radial resonant frequencies of said wheel.

7. In a system for absorbing a rail wheel's radial vibration, includes a rail on which a rail wheel is adapted to ride, said rail is supported by conventional railroad ties and is provided with vibration absorbers, the improvement comprising:

a series of said vibration absorbers forming rail vibration absorbers connected on said rail and interspersed between said railroad ties;

said rail vibration absorbers being tuned to absorb the vertical vibrations forced onto said rail by said wheel vibrations; and said rail vibration absorbers being oriented to damp vertical vibrations.

8. The system of claim 7, wherein said rail includes a web and a base, and said rail vibration absorbers include a base portion and a connection means; and including means connecting said base portion and said connection means to said rail base and symmetrically with said rail web.

9. In the system of claim 7, wherein said vibration absorbers include a steel base having at least two vibrating reeds and damping material sandwiched therebetween, the improvement further comprising:

means connecting said steel base in the system with said reeds extending in a direction transversely to the direction of vibration.

10. The system of claim 7, wherein each of said rail vibration absorbers comprise resonance absorbers including a reed embedded in a damping material, said reed having one end fixedly connected a the structure being damped.

11. The system of claim 10, including additional reeds each having one end fixedly connected with each other and the structure being damped and with said first-mentioned reed, each of said reeds having a thickness related to characteristic frequencies of vibration frequency to be damped, and additional damping material between each pair of adjacent reeds.

* * * * *